United States Patent [19]

Morin

[11] 3,829,763
[45] Aug. 13, 1974

[54] AUTOMOTIVE VOLTAGE AND CONTINUITY TESTER

[76] Inventor: Philip J. Morin, 118 Market St., Fort Kent, Maine 04743

[22] Filed: May 4, 1973

[21] Appl. No.: 357,087

[52] U.S. Cl. .................................................. 324/51
[51] Int. Cl. .......................................... G01r 31/02
[58] Field of Search ......................... 324/51, 53, 133

[56] References Cited
UNITED STATES PATENTS

| | | | |
|---|---|---|---|
| 1,433,264 | 10/1922 | Fahlenberg | 324/51 |
| 2,794,167 | 5/1957 | Jones | 324/53 |
| 2,933,680 | 4/1960 | Adams | 324/53 X |
| 3,047,798 | 7/1962 | Winslett | 324/53 |
| 3,157,870 | 11/1964 | Marino et al. | 324/133 X |
| 3,416,074 | 12/1968 | Schoonover | 324/133 X |
| 3,437,916 | 4/1969 | Mazurkevics | 324/133 X |
| 3,553,572 | 1/1971 | Harmon | 324/53 |

FOREIGN PATENTS OR APPLICATIONS

| | | | |
|---|---|---|---|
| 318,368 | 9/1929 | Great Britain | 324/51 |

Primary Examiner—Gerard R. Strecker

[57] ABSTRACT

An automotive voltage and continuity testing apparatus. The test circuit of the apparatus includes an indicator branch having in series a pair of indicating lamps. One side of a battery is connected to a first terminal point of the indicating branch, and a first test lead is connected to the other side of the battery. A second test lead is connected to the second terminal point of the indicating branch, so that when the pair of test leads are connected to a common conductor for testing continuity, the battery potential is applied at the terminal points of the indicator branch. A switched shorting branch is connected between the first terminal point and a point between the indicator lamps. The switch in said shorting branch is activated by an actuating branch connecting the terminal points. The switch is normally closed to short one of the indicating lamps and the battery potential is of such magnitude that the current through the switch actuating branch during continuity testing is insufficient to actuate the switch, whereby only one indicator lamp is lit if continuity is present. When a potential is electrically applied across the test leads, which potential in series with the battery provides a total potential exceeding a predetermined value, the current through the switch actuating branch opens the switch to electrically remove the shorting branch, permitting both of the indicator lamps to light. Such action thus permits automotive hot wires to be detected by contacting the hot wire with the second lead while the first lead is connected to a ground point on the auto chassis. A casing contains the test circuit and battery, with the test leads extending from the casing to enable the test functions. The indicating lamps, which may be LED's project through openings of the casing, as to be visible to an operator of the apparatus.

6 Claims, 2 Drawing Figures

PATENTED AUG 13 1974  3,829,763

3,829,763

AUTOMOTIVE VOLTAGE AND CONTINUITY TESTER

BACKGROUND OF INVENTION

This invention relates generally to electrical testing apparatus, and more specifically relates to testing apparatus useful in establishing the presence of electrically hot wires and conditions of electrical continuity in automotive vehicles.

Over the course of many years numerous hand-held testing apparatus have been designed, which are intended to aid the automotive mechanic in his task of inspecting and servicing the electrical system of automobiles. In the course of performing such testing the service man is particularly interested in having available a simple and dependable tool, enabling him to establish whether a wire, terminal or the like, forming part of the automobile electrical system, is electrically hot, by which is meant has the usual 12 volt or other potential derived from the automobile battery. Similarly, particularly where repair or installation of wiring is required, the service man has much interest in establishing whether a path of electrical continuity exists between two given points on or at the vehicle. In the past apparatus which enabled these two functions in a simple and foolproof manner have not been generally available, or at least, where proposed, have not achieved a high degree of commercial success. Among other reasons that may be cited for the apparent lack of wide-spread acceptance of prior instruments, has been that such instruments have been unduly complex, and costly to construct; and of corresponding difficulty to maintain. Commonly, for example, instruments for such purposes are provided with various switches, plug-in jacks, and so forth. Not only do these features lend complexity to the instruments and increase the cost thereof, but moreover switches or the like can readily be left in an ON position with resultant battery drain, so that the dependability of the instrument is impaired. Many of the prior instruments furthermore suffered from the possibility of burn-out in the indicators thereof, which tended to occur where the testors were accidentally exposed to the full voltage potential of the automotive system.

In accordance with the foregoing it may be regarded as an object of the present invention to provide a simple, rugged, compact, and highly dependable instrument, which includes no externally movable switches or the like, and which enables both automotive voltage and continuity testing.

SUMMARY OF INVENTION

Now in accordance with the present invention, the foregoing object, and others as will become apparent in the course of the ensuing invention, are achieved in an automotive and continuity testing apparatus, the test circuit of which includes an indicator branch having in series a pair of indicating lamps. One side of a battery is connected to a first terminal point of the indicating branch, and a first test lead is connected to the other side of the battery. A second test lead is connected to the second terminal point of the indicating branch, so that when the test leads are connected to a conductor for testing continuity thereof, the battery potential is applied at the terminal points of the indicator branch. A switched shorting branch is connected between the first terminal point and the junction of the indicator lamps. The switch contained in said shorting branch is activated by an actuating branch in parallel with the indicating branch. This switch is normally closed to short one of the indicating lamps, and the battery potential is of such magnitude that the current through the actuating branch during continuity testing is insufficient to open the switch, whereby only one indicator lamp is lit if continuity is present. When a test potential is electrically applied across the test leads, which potential in series with the battery, provides a voltage exceeding a predetermined value, the current through the switch actuating branch opens the switch to electrically remove the shorting branch, permitting both of the said indicator lamps to light. Such action thus enables automotive "hot" wires to be detected by contacting the hot wire with the second lead, while the first lead is connected to a ground point on the auto chassis. A casing contains the test circuit and battery, with test leads extending from the casing to enable the testing functions. The indicating lamps, which may be incandescent bulbs, light emitting diodes (LEDs) etc., project through openings of the casing, as to be visible to an operator of the apparatus.

BRIEF DESCRIPTION OF DRAWINGS

The invention is diagrammatically illustrated by way of example in the drawings appended hereto in which.

DESCRIPTION OF PREFERRED EMBODIMENT

Figure 1:
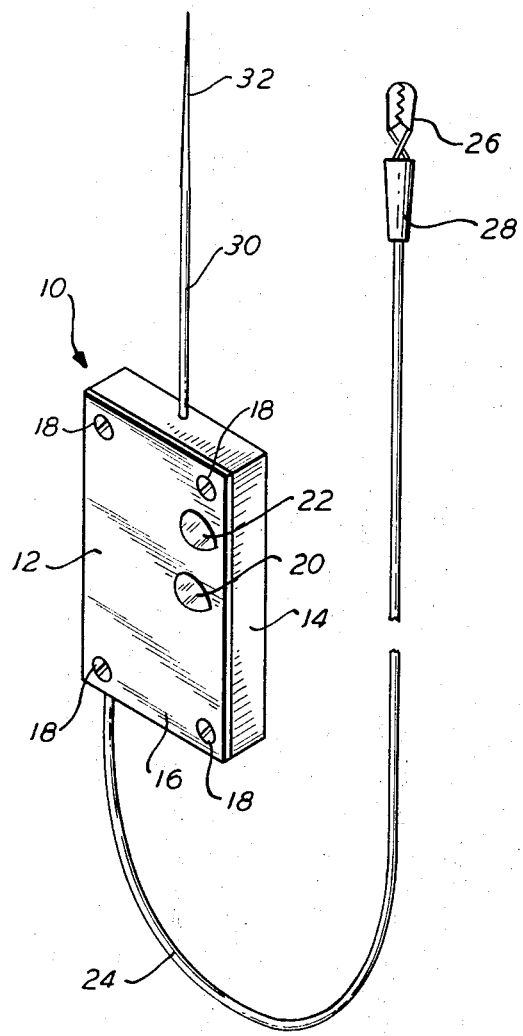
FIG. 1 is an external perspective view of apparatus in accordance with the invention.

In FIG. 1 herein, an external perspective view appears of apparatus 10 in accordance with the invention. The said apparatus is seen to externally comprise a compact casing 12, typically formed of molded plastic or the like, including a lower section 14 and a cover 16 secured thereto by threaded fasteners 18. A pair of indicator lamps 20 and 22 are visible at one side of the apparatus 10. A flexible, insulated conductor lead 24 extends from one end of casing 12, and terminates in a conventional alligator clamp 26, which, as is known, may be operated through a displaceable insulating collar 28. A second test lead in the form of a probe 30 extends from the opposite end of casing 12. Probe 30 is a relatively rigid conductor, and at least the tip 32 thereof is uninsulated so as to permit such tip to be placed into contact with a point on an automotive chassis desired to be inspected for potential. It will be noted that no external switches of any type are provided on the apparatus 12. This is an important aspect of the present invention, in that, as will become further apparent in connection with FIG. 2, testing functions performed by the said apparatus are carried out without the use of any external switching operations.

Figure 2:
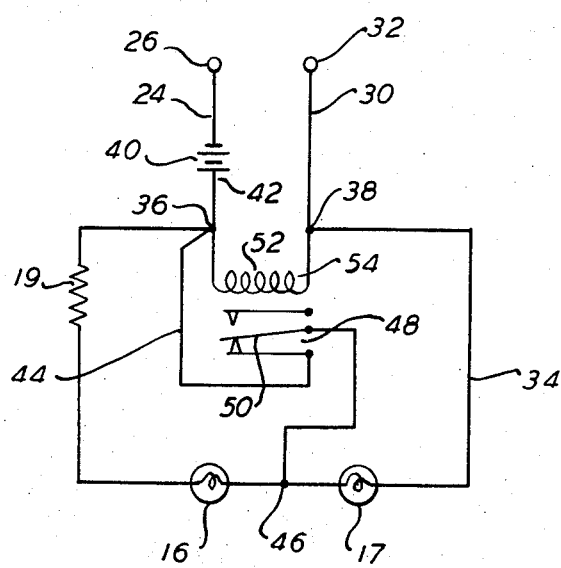
FIG. 2 is a simplified electrical schematic diagram of the circuitry of the FIG. 1 apparatus.

In FIG. 2 herein a simplified electrical schematic view appears, setting forth the basic electrical operation of the present device. Equivalent portions of the schematic circuit are identified by reference numerals corresponding to such elements as shown in FIG. 1. Firstly, there is seen that the indicator lamps 16 and 17 are disposed in the test circuit in an indicator branch 34, which branch may be regarded as extending between the first terminal point 36 and second terminal point 38. The lamps 16 and 18 can comprise simple low voltage flashlight bulbs as, for example, a 3.8 volt bulb or the like; however, low voltage and current drain devices such as light emitting diodes are also utilizable for such purpose. A battery indicated at 40 is completely self-contained within the casing 12, and typically may comprise a pair of pen-like cells or the like, yielding a potential of the order of 3 volts. The negative side 42 of the battery is connected to terminal point 36 of indicating branch 34, and the opposite side of the battery is connected to the test lead 24, which, as previously indicated, terminates in the connecting clam 26. The second test lead 30 is seen to be connected at one end thereof, to the second terminal point 38 for the indicating branch 34.

Next it is noted that a shorting branch generally designated at 44 extends between first terminal point 36, and the junction point 46 between indicator lamps 16 and 17. Shorting branch 44 includes a switch 48 which may be regarded as normally closed. For purposes of concretely illustrating the nature of the invention, this switch may comprise a single pole, double throw (SPDT) relay which is set to operate at a potential of 6 volts d.c. As indicated, the arm 50 of this switch is normally in such (shown) position that the shorting branch is closed. An actuating branch 52 for switch 48 extends between the terminal points 36 and 38 in parallel with indicating branch 34, and is illustrated as a coil 54 operating the relay which constitutes switch 48.

The manner in which the apparatus 10 is utilized to effect testing may now be appreciated. In a first instance, it may thus be assumed that one desires to test the continuity of a conductor in an automobile or the like. This is achieved by securing the clamp 26 to a conductor at one end of a conductive path to be tested, and contacting the probe tip 32 to the conductor at the other end of the said path. Under such conditions it will be evident that the potential of battery 40 is fully applied across the indicating branch 34. Similarly, however, it will be evident that the potential of the battery is also applied across the parallel actuating branch 52. In this case, however, the potential of the battery, being typically of the order of 3 volts, is intentionally designed to be of such level in relationship to the resistance of the actuating branch as to be insufficient to activate switch 48. In consequence shorting branch 44 remains electrically in the circuit, and it will therefore be apparent that continuity will be registered at the apparatus by the lighting of the single indicator 17, which is to say that only this indicator 17 lights with indicator 16 remaining unlit.

In those instances where it is desired to utilize the apparatus for purposes of testing for hot wires at the automobile, the test lead 24 is secured to a ground potential by clamping alligator clamp 26 to a ground point on the vehicle chassis. The operator thereupon manipulates the apparatus so that probe tip 32 contacts the point to be tested. It will be evident that under such circumstances the point to be detected will have the full positive potential of the vehicle battery thereat — if it is indeed "hot." Under such conditions the vehicle battery, one side of which is grounded (as is customary) to the vehicle chassis, is electrically placed in series with the battery 40. Accordingly, not only is the resultant series potential then applied across the terminal points 36 and 38 of the indicator branch 34, but moreover the potential is now sufficient across parallel actuating branch 52 so that the relay constituting switch 48 is activated. In other words, the arm 50 is displaced by current through coil 54 to open the shorting branch 44, electrically removing such branch from the test circuit. Under these conditions it will be evident therefore that current flows through the entire indicating branch (including limiting resistor 19) so that both the series connected lamps 16 and 17 are lit, thereby indicating to the operator of the apparatus that he has indeed contacted a hot point on the vehicle electrical system.

While the present invention has been particularly set forth in terms of specific embodiments thereof, it will be understood in view of the instant disclosure, that numerous variations on the invention are now enabled to those skilled in the art. For example, in the embodiment of the invention set forth in FIG. 2, the shorting branch 44 includes an electro-mechanical switch, specifically the SPDT relay shown. It will, however, be evident to those skilled in the art that solid state switching components as, for example, switching transistors and appropriately biased SCR's may be utilized to switch said branch in and out of the circuit, depending upon the potential across the test leads. Accordingly, the invention is to be broadly construed and limited only by the scope and spirit of the claims now appended hereto.

I claim:
1. An automotive voltage and continuity testing apparatus comprising:
   a test circuit including an indicator branch having in series a pair of like indicating lamps, said branch terminating at first and second terminal points;
   battery means one side of which is connected to apply a first potential at such first terminal point;
   a first test lead connected to the other side of said battery;
   a second test lead connected to the second terminal point of said indicating branch, whereby when said test leads are connected to a common conductor for testing continuity thereof, said battery potential is applied at said terminal points of said branch;
   a switched shorting branch being connected between said first terminal point of said indicating branch and the junction point between said indicator lamps;
   an actuating branch for said switch connected in parallel with said indicating branch, the current through said actuating branch acting to move said switch from a first to second position when said current exceeds a predetermined value;
   said switch being normally closed to short one of said indicating lamps, and said battery potential source being of such magnitude that the current through said switch actuating branch during continuity testing is insufficient to actuate said switch, whereby during said continuity testing only one said indicator lamp is lit if continuity is present; and
   whereby when a potential is electrically applied across said test leads, which potential in series with said battery provides a total potential exceeding a predetermined value, the current through said switch actuating branch opens said switch to electrically remove said shorting branch and permit both said lamps to light, whereby automotive hot wires may be detected by contacting said wire with said second lead while said first lead is connected to a ground point on said auto chassis.

2. Apparatus in accordance with claim 1, wherein said second test lead comprises a probe tip, and wherein said first lead comprises a conductor terminating in a member clampable to ground.

3. Apparatus in accordance with claim 1, wherein said switch comprises a single pole double throw relay, said actuating branch comprising the coil for effecting opening of said relay.

4. Apparatus in accordance with claim 1, wherein said switch comprises a solid state switching device.

5. Apparatus in accordance with claim 2, further including a case for containing said test circuit and battery means, said test leads extending from said case to enable said test functions, and said indicating lamps projecting through openings of said case and being available to an operator of said apparatus.

6. Apparatus in accordance with claim 5, wherein said indicating lamps comprise light emitting diodes.

* * * * *